(12) United States Patent
Hammerschmidt

(10) Patent No.: US 7,400,609 B2
(45) Date of Patent: Jul. 15, 2008

(54) PARTITIONING SCHEME FOR AN OFDM TRANSCEIVER

(75) Inventor: Joachim S. Hammerschmidt, New Providence, NJ (US)

(73) Assignee: Agere Systems Inc., Allentown, PA (US)

( * ) Notice: Subject to any disclaimer, the term of this patent is extended or adjusted under 35 U.S.C. 154(b) by 1145 days.

(21) Appl. No.: 10/354,601

(22) Filed: Jan. 30, 2003

(65) Prior Publication Data

US 2004/0151145 A1    Aug. 5, 2004

(51) Int. Cl.
*H04Q 7/24* (2006.01)
*H03C 7/02* (2006.01)
(52) U.S. Cl. .................................. 370/338; 455/101
(58) Field of Classification Search ................. 370/338, 370/343, 348, 349; 455/101–102, 562.1, 455/67.11, 67.13, 272, 277.1, 277.2, 127.1, 455/127.2; 375/299
See application file for complete search history.

(56) References Cited

U.S. PATENT DOCUMENTS

| | | | |
|---|---|---|---|
| 2003/0007632 A1* | 1/2003 | Schoessow | 379/399.01 |
| 2003/0231715 A1* | 12/2003 | Shoemake et al. | 375/267 |
| 2004/0082356 A1* | 4/2004 | Walton et al. | 455/522 |
| 2004/0087275 A1* | 5/2004 | Sugar et al. | 455/61 |
| 2006/0077935 A1* | 4/2006 | Hamalainen et al. | 370/334 |
| 2006/0093067 A1* | 5/2006 | Jalali et al. | 375/299 |

FOREIGN PATENT DOCUMENTS

EP    1 176 737 A2    1/2002

(Continued)

OTHER PUBLICATIONS

Indoor Throughput and Range Improvements Using Standard Compliant AP Antenna Diversity in IEEE 802.11a and ETSI Hiperlan/2, by M.K. Abdul Aziz, M.R.G. Butler, A. Doufexi, A.R. Nix and P.N. Fletcher, Center for Communications Research, University of Bristol, UK; 2001 IEEE, pp. 2294-2298.

(Continued)

*Primary Examiner*—Kwang B. Yao
*Assistant Examiner*—Tung Q Tran
(74) *Attorney, Agent, or Firm*—Mendelsohn & Associates, P.C.; Yuri Gruzdkov; Steve Mendelsohn

(57) ABSTRACT

A channel estimation method for an OFDM transceiver. The OFDM transceiver is configured to derive channel state information (CSI) for a communication channel by processing the preamble of a received OFDM packet. The received packet could be, for example, an unsolicited data packet or a solicited service packet such as an acknowledgement packet. The derived CSI information can then applied to the generation of weighted OFDM packets for transmission over the communication channel. As a result, an improved effective communication channel may be established between this OFDM transceiver and another OFDM transceiver. A channel estimation method of the present invention may be implemented in an access point (AP) or a client terminal (CLT) of a WLAN system. In either case, the improved communication channel can be used, for example, to extend the range corresponding to a selected transmission bit rate and/or to increase the transmission bit rate between the AP and a CLT. In addition or alternatively, the improved communication channel can be used to reduce emitted RF power and, therefore, to reduce electrical power consumption.

20 Claims, 13 Drawing Sheets

FOREIGN PATENT DOCUMENTS

| | | |
|---|---|---|
| EP | 1 182 817 A1 | 2/2002 |
| WO | WO 02/082688 A1 | 10/2002 |
| WO | WO 2004/039011 A2 | 5/2004 |

OTHER PUBLICATIONS

"COFDM with Orthogonal Transmit Diversity and Power Control for Broadband Wireless Communications*" by Mohammad Torabi et al. IEEE Canadian Conference on Electrical & Computer Engineering, vol. 1 of 3, May 12, 2002, pp. 1331-1336, XP010707483.

"The Performance of Hiperlan/2 Systems with Multiple Antennas" by M.R.G. Butler et al., vol. 3 of 4, Conf. 53, May 6, 2001, pp. 2123-2127, XP001082518.

\* cited by examiner

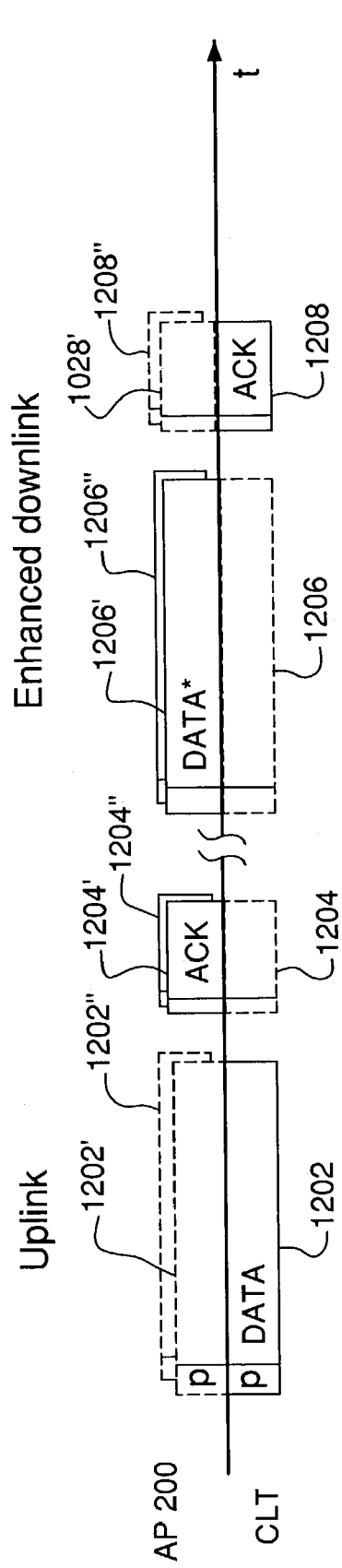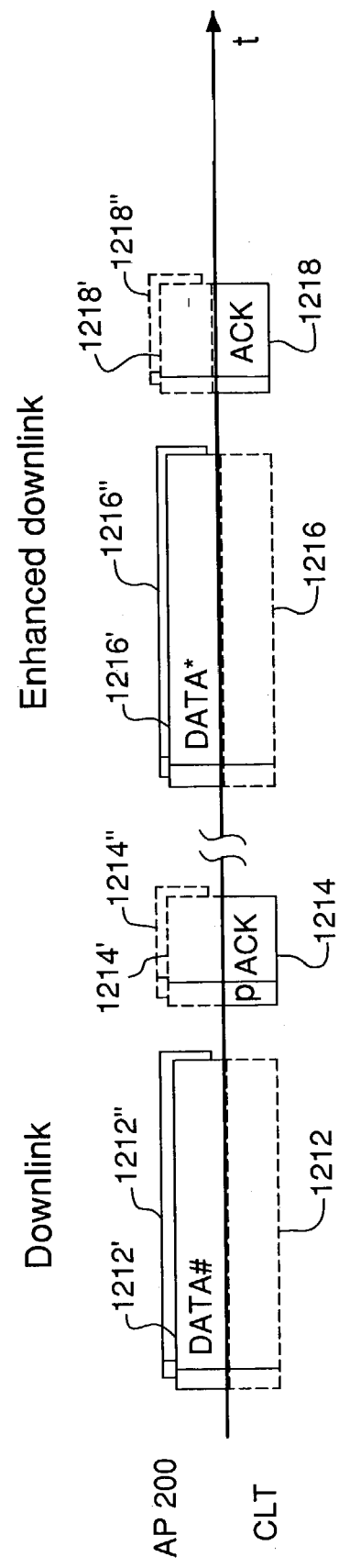
FIG. 12A
FIG. 12B

PARTITIONING SCHEME FOR AN OFDM TRANSCEIVER

BACKGROUND OF THE INVENTION

1. Field of the Invention

The present invention relates to communication equipment and, more specifically, to equipment for wireless local area networks (WLANs).

2. Description of the Related Art

Reliable and efficient transmission of information signals over imperfect communication channels is essential for wireless communication systems. One successful approach to achieving such transmission is multi-carrier modulation (MCM). The principle of MCM is to divide a communication channel into a number of sub-carriers (also called tones or bins), each independently modulated. Information is modulated onto a tone by varying the tone's phase, amplitude, or both.

Orthogonal frequency division multiplexing (OFDM) is a form of MCM, in which tone spacing is selected such that each tone is orthogonal to all other tones. OFDM WLAN systems are typically designed to conform to either a contention-based wireless medium access standard such as IEEE 802.11 or a scheduled time-division duplex (TDD) wireless medium access standard such as ETSI HIPERLAN/2. In a WLAN system conforming to a contention-based standard, OFDM stations compete for access to the wireless medium using "fair contention" medium-sharing mechanisms specified in the standard. In contrast, medium access in a scheduled TDD conforming WLAN system is controlled by a single designated station, which schedules medium access for all other participating transceivers.

IEEE Standard 802.11 and its extensions 802.11a/b/g specify the physical layers and medium access control procedures for OFDM WLAN systems. For example, an 802.11a-compliant system operates in the 5-GHz radio-frequency band and provides data communication capabilities of 6, 9, 12, 18, 24, 36, 48, and 54 Mbit/s. The system uses 52 tones (numbered from −26 to 26, excluding 0) that are modulated using binary or quadrature phase shift keying (BPSK/QPSK), 16-quadrature amplitude modulation (QAM), or 64-QAM. In addition, the system employs forward error correction (convolutional) coding with a coding rate of ½, ⅔, or ¾.

FIG. 1 is a block diagram of a representative OFDM transceiver 100 of the prior art that can be configured, for example, as an access point (AP) or a client terminal (CLT) in a WLAN system. A typical WLAN system has an AP that provides access to the backbone, wired network for one or more wireless CLTs. Transceiver 100 has a receive path 102 and a transmit path 104, both coupled, at one end, to a medium access controller (MAC) 106 and, at the other end, to an antenna 124 via switch 126. Depending on the mode of operation, switch 126 connects antenna 124 to either transmit path 104 or receive path 102.

In transmit path 104, information bits received via MAC 106 are encoded and interleaved by a convolutional encoder 108 and interleaver 110, respectively. The interleaved data are then converted from the binary format into, e.g., QAM values using a mapping converter 112. To facilitate coherent reception, four pilot values are added to each 48 data values to form an OFDM symbol having 52 QAM values. The QAM values are demultiplexed in a serial-to-parallel (S/P) converter 114 and modulated onto 52 tones using an inverse fast Fourier transform (IFFT) element 116, which tones are then combined in a parallel-to-serial (P/S) converter 118. A cyclic prefix (CP) is added in a CP adder 120 to reduce inter-symbol interference due to the multi-path delay spread (signal dispersion) in the communication channel. The resulting OFDM symbol is applied to a radio-frequency (RF) transmitter 122, where it is converted to an analog signal, up-converted to the 5-GHz band, and transmitted through antenna 124.

Receive path 102 is designed to perform the reverse operations of transmit path 104 as well as additional training functions. In particular, RF signals are received through antenna 124 by an RF receiver 128, which first estimates frequency offset and symbol timing using special training symbols in the preamble of each OFDM data packet. Receiver 128 divides the received RF signals into OFDM symbols, which are then frequency down-shifted and digitized. A CP-removing circuit 130 strips each symbol of the cyclic prefix and applies the result to an S/P converter 132. A fast Fourier transform (FFT) element 134 then recovers QAM values corresponding to the 52 tones. The training symbols and pilot tones are used to correct for the communication channel response as well as phase drift. The recovered QAM values are then multiplexed, de-mapped, and de-interleaved using a P/S converter 136, de-mapping converter 138, and de-interleaver 140, respectively, to recover the corresponding binary data. The information bits are decoded from the binary data in a convolutional (e.g., Viterbi) decoder 142 and then output from transceiver 100 via MAC 106.

One problem with transceiver 100 is related to the reliability of operation in relatively high-scattering environments, such as homes, offices, and/or production facilities. In particular, high-rate transmission/reception (e.g., at rates over 20 Mbit/s) is very sensitive to the quality of the communication channel. In addition, RF signals in the 5-GHz band intended for such high-rate transmission/reception are subjected to a higher propagation loss than those in, for example, a 2.4-GHz band. As a result, operation at high rates may be limited to a relatively short range. Outside that range, lower fall-back rates (e.g., 6 Mbit/s) may have to be utilized. This limits information throughput and may cause, for example, a WLAN system employing transceiver 100 as an access point to operate at a fraction of its potential capacity.

SUMMARY OF THE INVENTION

The problems in the prior art are addressed in accordance with the principles of the present invention by a channel estimation method for an OFDM transceiver. The OFDM transceiver is configured to derive channel state information (CSI) for a communication channel by processing the preamble of a received OFDM packet. The received packet could be, for example, an unsolicited data packet or a solicited service packet such as an acknowledgement packet. The derived CSI information can then applied to the generation of weighted OFDM packets for transmission over the communication channel. As a result, an improved effective communication channel may be established between this OFDM transceiver and another (e.g., single-antenna) OFDM transceiver. A channel estimation method of the present invention may be implemented in an access point (AP) or a client terminal (CLT) of a WLAN system. In either case, the improved communication channel can be used, for example, to extend the range corresponding to a selected transmission bit rate and/or to increase the transmission bit rate between the AP and a CLT. In addition or alternatively, the improved communication channel can be used to reduce emitted RF power and, therefore, to reduce electrical power consumption.

According to one embodiment, the present invention is a method of signal processing for a WLAN system, comprising: receiving incoming signals transmitted from a second node of the WLAN system at first and second antennas of a first node of the WLAN system; based on the incoming signals, determining attenuation information for first and second sub-channels corresponding to the first and second antennas, respectively; and generating outgoing signals for transmission from the first and second antennas to the second node using a multi-carrier modulation scheme based on a plurality of tones, wherein, for each tone, substantially all RF power is applied to the sub-channel having lower relative attenuation.

According to another embodiment, the present invention is an apparatus for a first node in a WLAN system, comprising: a receive path adapted to (i) receive incoming signals transmitted from a second node of the WLAN system at first and second antennas of the first node, and (ii) determine, based on the incoming signals, attenuation information for first and second sub-channels corresponding to the first and second antennas, respectively; and a transmit path adapted to generate outgoing signals for transmission from the first and second antennas to the second node using a multi-carrier modulation scheme based on a plurality of tones, wherein, for each tone, substantially all RF power is applied to the sub-channel having lower relative attenuation.

BRIEF DESCRIPTION OF THE DRAWINGS

Other aspects, features, and benefits of the present invention will become more fully apparent from the following detailed description, the appended claims, and the accompanying drawings in which:

FIGS. 12-15 graphically show channel estimation processing for different scenarios of communication sequences involving the transceiver of FIG. 2.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Multi-Branch Transceiver

Figure 1:
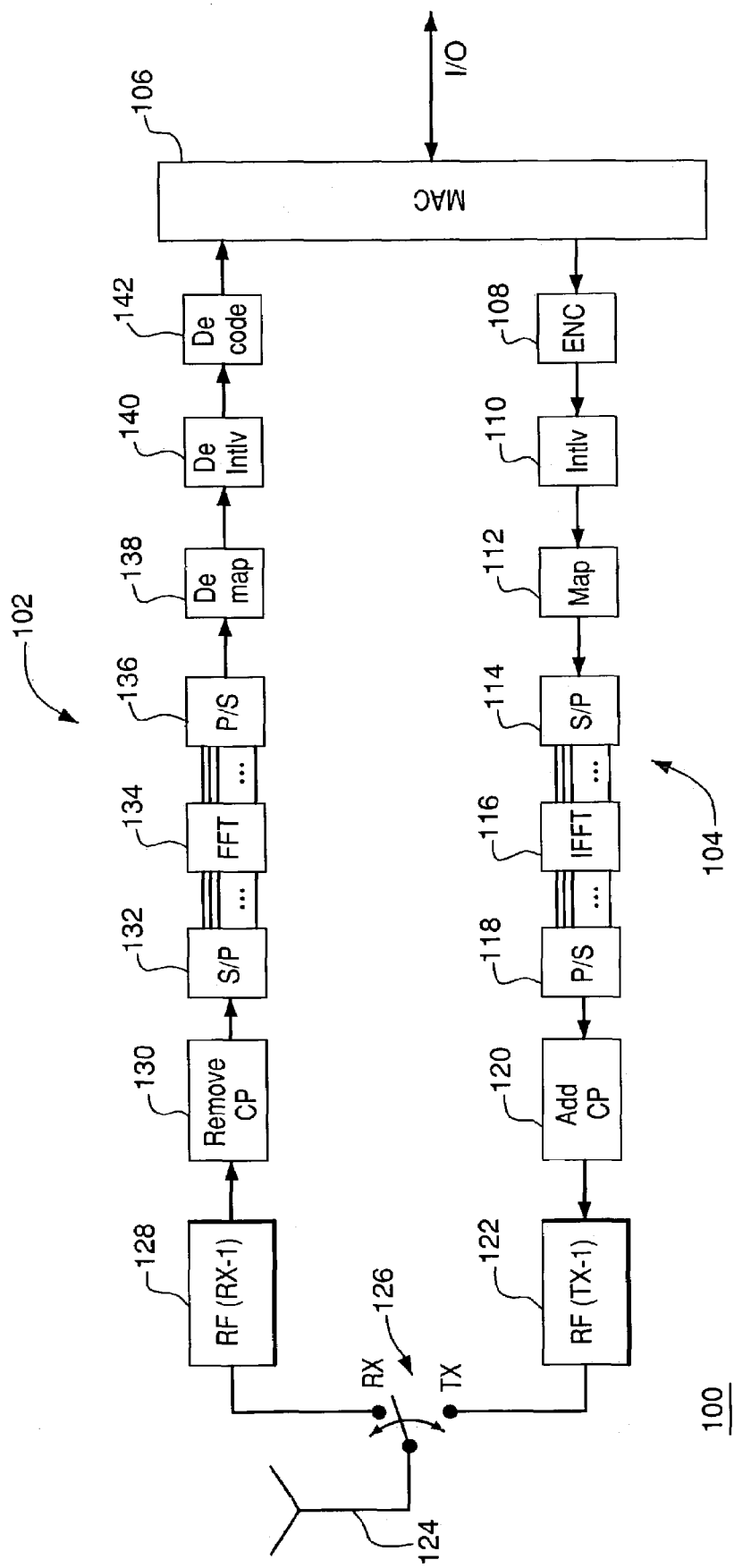
FIG. 1 is a block diagram of a representative OFDM transceiver of the prior art.
Figure 2:
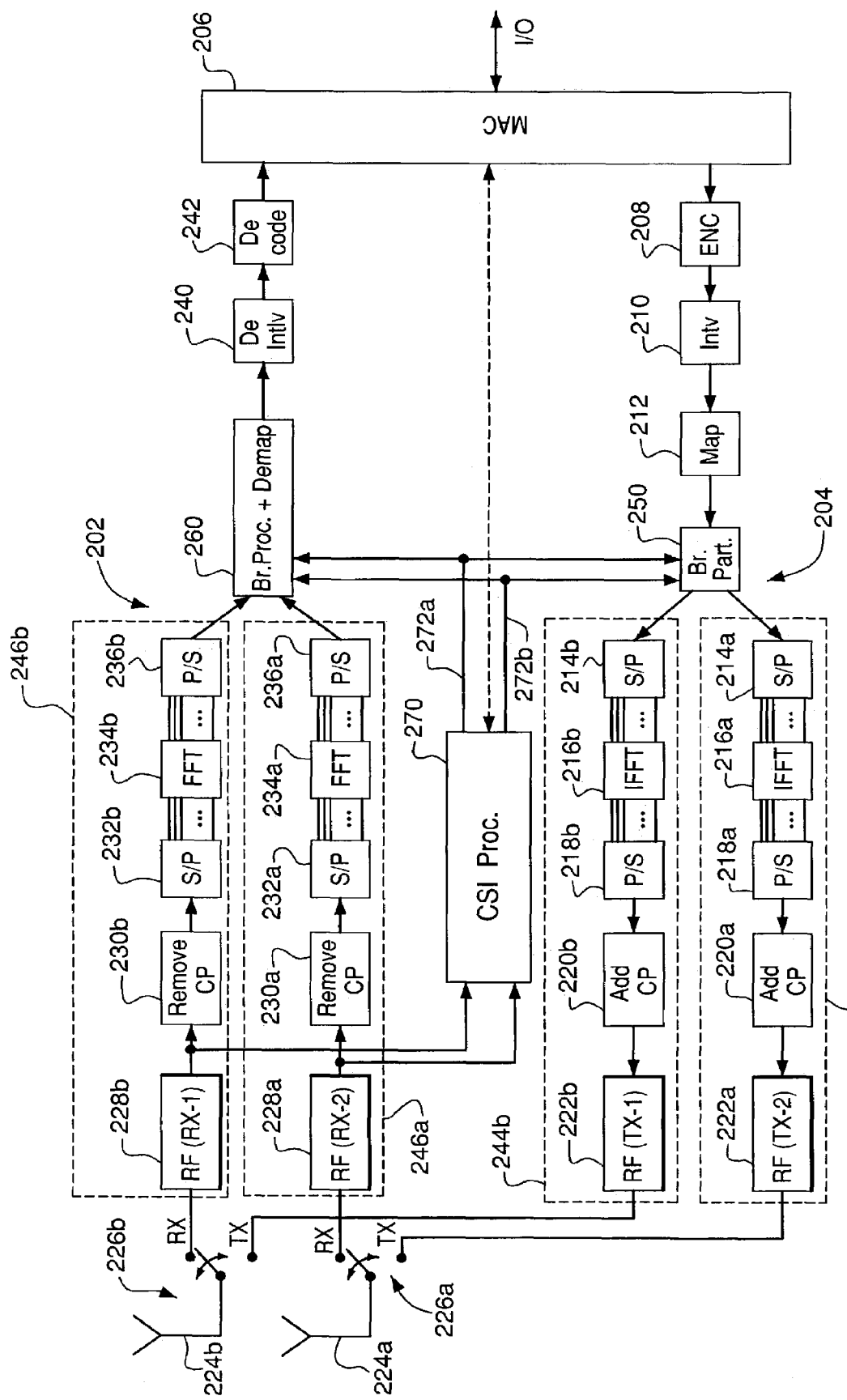
FIG. 2 is a block diagram of an OFDM transceiver according to one embodiment of the present invention.

FIG. 2 shows a block diagram of an OFDM transceiver 200 according to one embodiment of the present invention. Depending on the implementation, transceiver 200 can be deployed in either a contention-based or a scheduled TDD-based WLAN system having an AP and one or more wireless CLTs. In a preferred WLAN configuration of the present invention, the AP has transceiver 200 and each CLT has a single-antenna transceiver (e.g., transceiver 100 of FIG. 1). In an alternative WLAN configuration of the present invention, the AP has a single-antenna transceiver and at least one CLT has transceiver 200.

Similar to transceiver 100 of FIG. 1, transceiver 200 has a receive path 202 and a transmit path 204, both coupled, at one end, to a MAC 206. However, in contrast with transceiver 100, each path 202 and 204 of transceiver 200 has two branches, i.e., two receiver branches 246a-b and two transmitter branches 244a-b, respectively. Each of branches 246a-b of receive path 202 includes an RF receiver 228, a CP-removing circuit 230, an S/P converter 232, an FFT element 234, and a P/S converter 236, which are analogous to the similarly labeled (i.e., having the same last two digits) elements of receive path 102 (FIG. 1). Similarly, each of branches 244a-b of transmit path 204 includes an S/P converter 214, an IFFT element 216, a P/S converter 218, a CP adder 220, and an RF transmitter 222, which are analogous to the similarly labeled elements of transmit path 104 (FIG. 1). Branches 244a and 246a are coupled to a first antenna 224a via switch 226a, and branches 244b and 246b are coupled to a second antenna 224b via switch 226b. Antennas 224a-b are spatially separated and, depending on the state of switches 226a-b, provide either transmission or reception of RF signals for transmitter branches 244a-b and receiver branches 246a-b, respectively. In alternative embodiments, a transceiver of the present invention may have receive and transmit paths each with three or more branches selectively coupled to three or more antennas.

In addition to branches 244a-b, transmit path 204 includes a convolutional encoder 208, an interleaver 210, a mapping converter 212, and a branch weighting and partitioning circuit 250. In addition to branches 246a-b, receive path 202 includes a branch processing and de-mapping circuit 260, a de-interleaver 240, and a convolutional (e.g., Viterbi) decoder 242. With the exception of circuits 250 and 260, which will be described in more detail below, the other above-listed elements of paths 202 and 204 are analogous to the similarly labeled elements of paths 102 and 104 (FIG. 1).

In one embodiment, circuits 250 and 260 are controlled by a channel state information (CSI) processor 270, which is coupled to receive signals from RF receivers 228a-b and MAC 206. Processor 270 is configured to derive and store the CSI information for the communication sub-channels corresponding to antennas 224a-b. As used in this specification, the term "sub-channel" refers to the wireless medium that supports signal propagation between one of antennas 224a-b and the antenna of another transceiver. In particular, in one configuration, a CSI set for the two sub-channels associated with antennas 224a-b may include, for each sub-channel, the attenuation and/or phase shift associated with transmission of each tone via that sub-channel. In a different configuration, for each tone, the CSI set may include a number (e.g., 0 or 1) indicating the sub-channel having lower relative attenuation. In one embodiment, processor 270 controls circuits 250 and 260 via signals 272a-b, which are generated based on the current CSI set. In one configuration, processor 270 updates the CSI set each time a new OFDM packet arrives at transceiver 200.

Figure 3A:
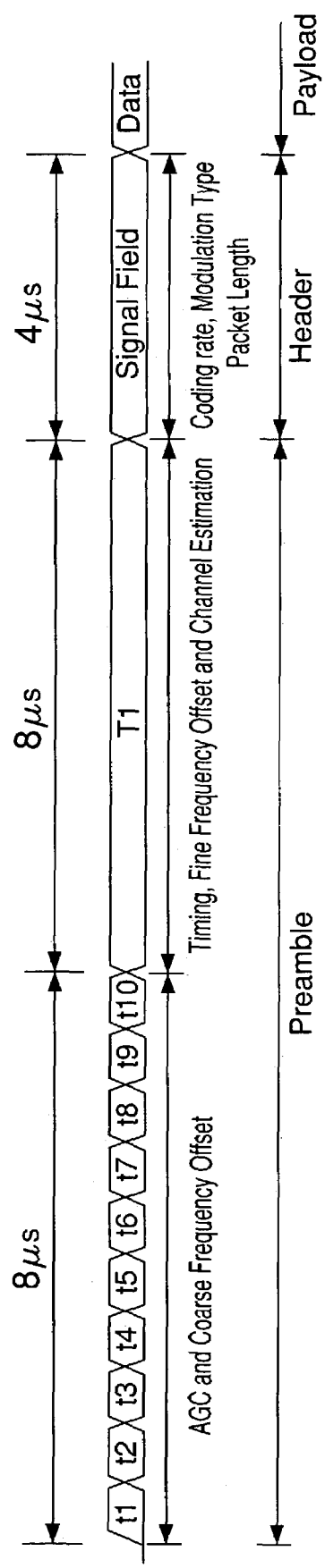
FIGS. 3A-B show schematically the structure of an OFDM packet that can be used in the operation of the transceiver shown in FIG. 2.
Figure 3B:
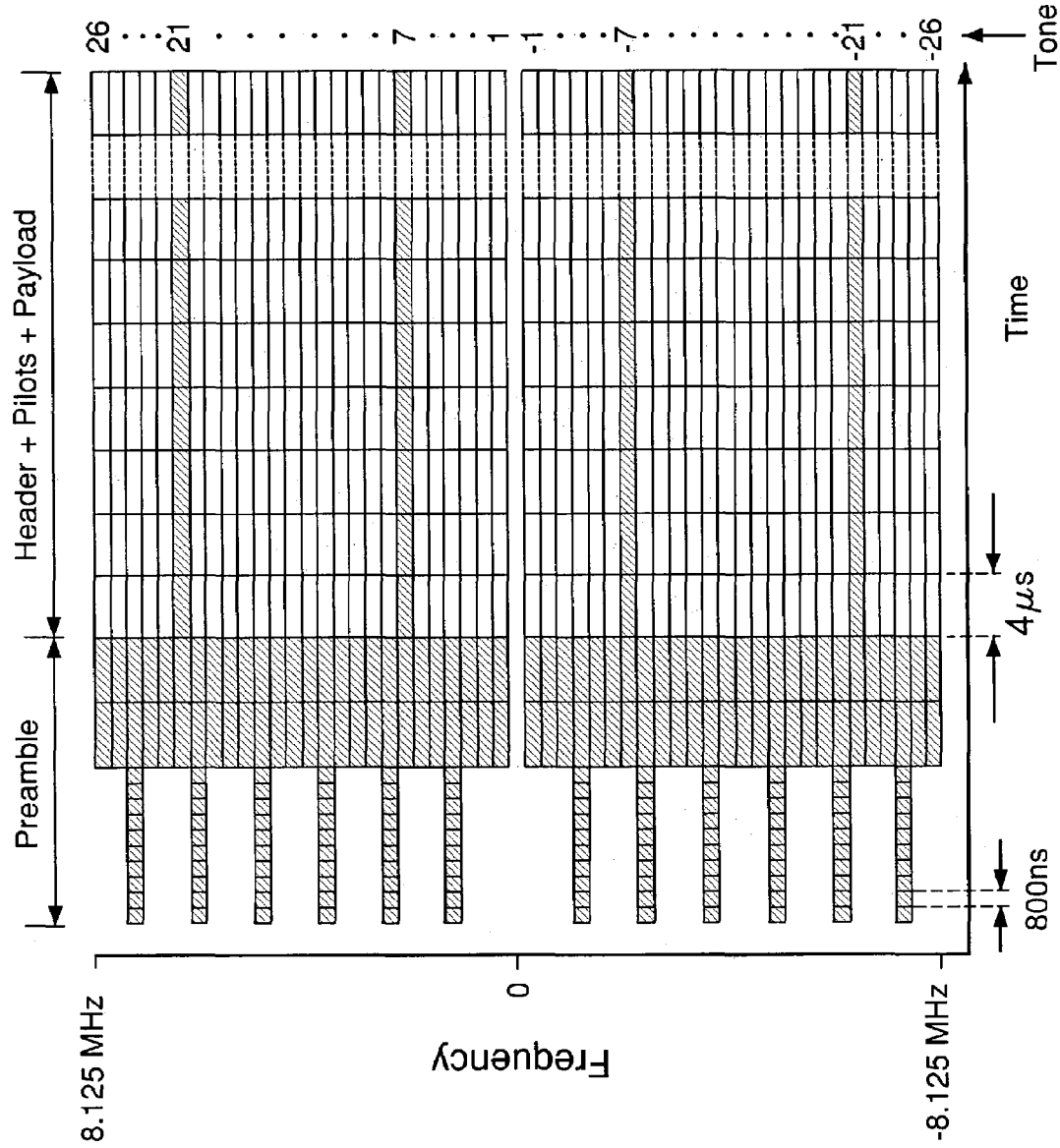

FIGS. 3A-B illustrate the structure of an OFDM packet according to Standard 802.11. More specifically, FIG. 3A shows the time structure of part of an OFDM packet corresponding to one tone (e.g., tone number 20), and FIG. 3B shows the time-frequency structure of the entire OFDM packet. Each OFDM packet has a preamble followed by a header and a data payload portion. The preamble has two parts, each 8 μs long; the header is 4 μs long; and the data payload portion is of variable length. Tones number −21, −7, 7, and 21 are the four pilot tones and all marked (filled) rectangles in FIG. 3B correspond to known training values.

The first part of the preamble has ten repetitions (labeled t1 through t10 in FIG. 3A) of a training symbol with a duration of 800 ns. This part, which is transmitted using a subset of tones, whose numbers are an integer multiple of 4 (i.e., tone numbers −24, −20, −16, −12, −8, −4, 4, 8, 12, 16, 20, and 24) as illustrated in FIG. 3B, is used for automatic gain control (AGC) and coarse frequency offset. The second part of the preamble has a long training symbol (labeled T1 in FIG. 3A), which occupies two regular OFDM symbol slots. This part of the preamble, which is transmitted using all 52 tones (FIG. 3B), is used for timing, fine frequency offset, and channel estimation. The preamble is followed by the header, which occupies one regular OFDM symbol slot as illustrated in FIG. 3A. The header includes information about the coding rate, modulation type, and packet length and is followed by the data payload portion.

In one embodiment, processor 270 of transceiver 200 obtains the CSI information by processing the second part of the preamble (T1 in FIG. 3A). Since all values transmitted in that part are known training values, the attenuation and phase shift corresponding to the propagation of each of the 52 tones in the communication sub-channel corresponding to the respective antenna can be obtained. In one embodiment, processor 270 derives and stores the CSI information in the form of complex values $C_{a,b}(n)$, each having an amplitude and a phase, where indices a and b indicate the antenna, n is the tone number, each amplitude $|C_{a,b}(n)|$ and phase $\phi_{a,b}(n)$ correspond to the attenuation and phase shift, respectively, of the n-th tone in the respective communication sub-channel.

In one configuration, transceiver 200 operates as an AP of a WLAN system. In addition to transceiver 200, the WLAN system includes one or more single-antenna CLTs. The CLTs share the wireless medium, e.g., as described in Standard 802.11a, such that only one CLT at a time sends (uplink) data to or receives (downlink) data from AP 200. In one embodiment, processor 270 derives and stores a different CSI set for each different CLT using CLT identification provided by MAC 206.

Receive Operation

This section relates to receive operation of transceiver 200 according to embodiments of the present invention. If transceiver 200 is configured as an AP of a WLAN system, then the receive operation corresponds to an uplink (UL) transmission. In a preferred configuration, the WLAN system includes (i) an AP having transceiver 200 and (ii) one or more CLTs, each having a single-antenna transceiver, e.g., transceiver 100 of FIG. 1.

During a UL transmission, transceiver 200 receives RF signals from a CLT via two antennas 224a-b. Employing two or more antennas improves signal reception due to the effects of (i) array gain and (ii) spatial diversity. The term "array gain" relates to the fact that two antennas will on average capture twice the amount of energy corresponding to a single antenna. The term "spatial diversity" relates to the fact that signal reception on different antennas is typically subjected to different (uncorrelated) fading effects. Therefore, if the signals corresponding to one sub-channel are in a deep fade, then the probability for the signals corresponding to the second sub-channel to be in a similarly deep fade is relatively low. As a result, the magnitude of temporal fluctuations of the captured RF power is reduced, which produces a more reliable effective communication channel between the AP and CLT.

Figure 4:
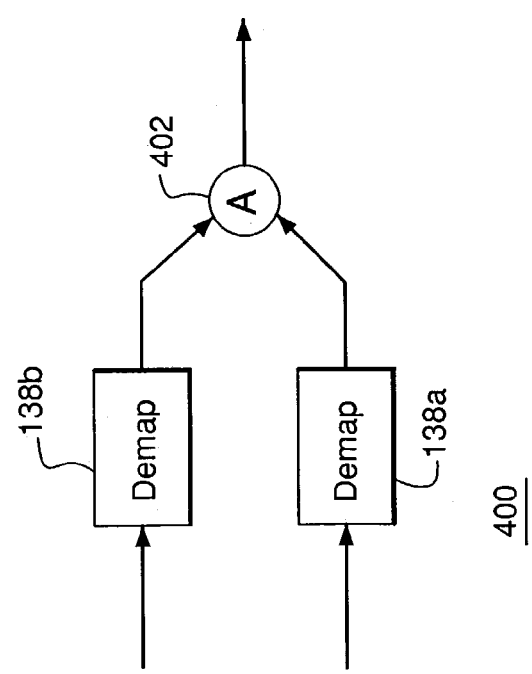
FIG. 4 shows a block diagram of a branch processing and de-mapping circuit of the transceiver shown in FIG. 2 according to one embodiment of the present invention.

FIG. 4 shows circuit 400, which can be used as circuit 260 in transceiver 200 (FIG. 2) according to one embodiment of the present invention. As already indicated above, circuit 260 processes the outputs of two receiver branches 246a-b coupled to two antennas 224a-b. Circuit 400 of FIG. 4 comprises two de-mapping converters 138a-b, each converter coupled to the corresponding receiver branch 246. Each converter 138 generates a soft reliability value for each information bit based on the frequency-domain in-phase (I) and quadrature (Q) values generated by the corresponding FFT element 234. The two soft values corresponding to an information bit are applied to a soft adder 402 where they are maximum-likelihood (ML) combined as known in the art to produce a new soft reliability value for that information bit. This new soft reliability value is output from circuit 400 and applied to de-interleaver 240 of FIG. 2.

Figure 5:
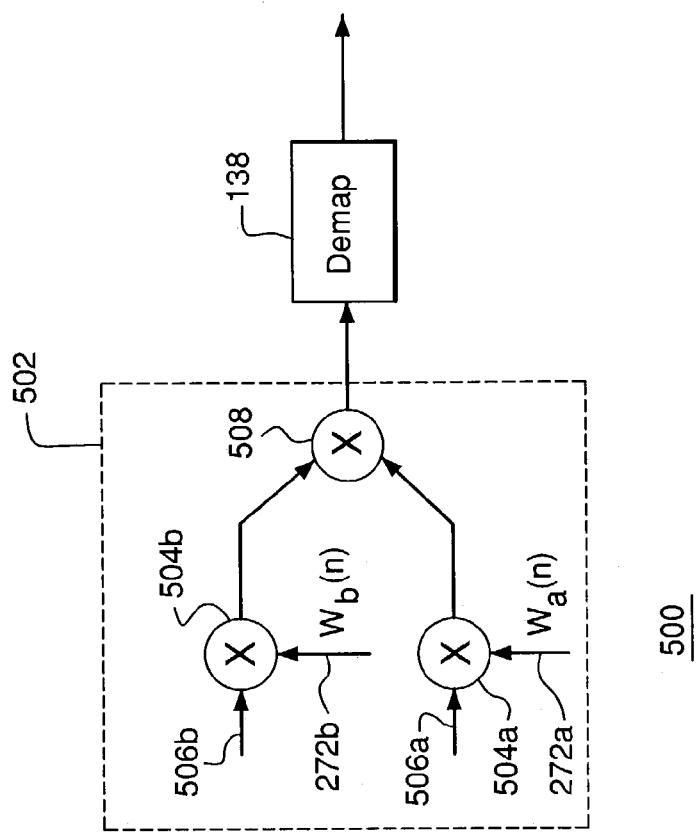
FIG. 5 shows schematically a branch processing and de-mapping circuit of the transceiver shown in FIG. 2 according to another embodiment of the present invention.

FIG. 5 shows circuit 500, which can be used as circuit 260 in transceiver 200 (FIG. 2) according to another embodiment of the present invention. Circuit 500 comprises an I/Q processor 502 and de-mapping converter 138. For each OFDM tone, processor 502 processes two I/Q pairs generated by FFT elements 234a and 234b, respectively, to produce a new I/Q pair denoted as I'/Q'. The I'/Q' pair is then processed by converter 138 as if it originated from one tone. In one embodiment, processor 502 implements a technique commonly referred to in the art as Maximum Ratio Combining (MRC).

In one embodiment, processor 502 processes I/Q pairs as follows. For each tone, a complex value Z(n) is calculated according to the following equation:

$$Z(n)=W_a(n)(I_a(n)+iQ_a(n)) +W_b(n)(I_b(n)+iQ_b(n)) \qquad (1)$$

where indices a and b indicate the antenna; n is the tone number; $I_a(n)/Q_a(n)$ and $I_b(n)/Q_b(n)$ are the I/Q pairs corresponding to the n-th tone and applied to processor 502 by branches 246a and 246b, respectively; and $W_a(n)$ and $W_b(n)$ are weighting coefficients. The I'/Q' pair corresponding to the n-th tone can then be determined from Z(n) as follows:

$$I'(n)=ReZ(n) \qquad (2A)$$

$$Q'(n)=ImZ(n) \qquad (2B)$$

In one implementation, weighting coefficients are derived from a CSI set as follows:

$$W_{a,b}(n) = \frac{C_{a,b}^*(n)}{\sqrt{|C_a(n)|^2 + |C_b(n)|^2}} \quad (3)$$

where $C_{a,b}(n)$ are complex values corresponding to the CSI information and explained in the preceding section, and the asterisk denotes the complex conjugate.

In one embodiment, the derivation of weighting coefficients $W_{a,b}(n)$ according to Equation (3) is implemented in processor 270. In another embodiment, signals 272a-b provide values of $C_{a,b}(n)$ to processor 260, where processing corresponding to Equation (3) is implemented to generate weighting coefficients $W_{a,b}(n)$. In a different embodiment, processing different from that corresponding to Equation (3) may be implemented in either processor 260 or processor 270 to generate weighting coefficients.

In one embodiment, processor 502 includes two complex-number multipliers 504a-b and a complex-number adder 508. Each multiplier 504 receives two inputs. For example, multiplier 504a receives signal 506a from receiver branch 246a and signal 272a from CSI processor 270 (FIG. 2). Similarly, multiplier 504b receives signal 506b from receiver branch 246b and signal 272b from CSI processor 270. Signals 506a and 506b provide $I_a(n)/Q_a(n)$ and $I_b(n)/Q_b(n)$ pairs, respectively, and signals 272a and 272b provide weighting coefficients $W_a(n)$ and $W_b(n)$, respectively. Each multiplier 504 performs complex-number multiplication and generates a weighted I/Q pair for each tone. The results are applied to adder 508, where, for each tone, the two weighted I/Q pairs are combined to generate an I'/Q' pair, which is then applied to and processed by converter 138, the output of which is applied to de-interleaver 240 of FIG. 2.

The inventor's own research demonstrated that transceiver 200 receiving signals via two antennas and processing them in accordance with the above-described embodiments improves signal-to-noise ratio (SNR) over that of a single-antenna transceiver (e.g., transceiver 100) by about 5 to 8 dB for packet error rates (PER) between about 1 and 10%. This improvement can be used, for example, to extend the range corresponding to a selected transmission bit rate and/or to increase the transmission bit rate between, e.g., an AP and a CLT. In addition or alternatively, this improvement may be used to lower the emitted RF power. Such power reduction may help to extend battery life for a wireless CLT.

Transmit Operation

This section relates to transmit operation of transceiver 200. If transceiver 200 is configured as an AP of a WLAN system, then the transmit operation corresponds to downlink (DL) transmission.

During a DL transmission, AP transceiver 200 transmits RF signals to a CLT via two antennas 224a-b. In one embodiment, transceiver 200 generates weighted OFDM packets for transmission on the two antennas by processing signals corresponding to each tone. The processing may include, for each tone, (i) partitioning the RF power corresponding to the tone between the antennas and (ii) in different transmitter branches, applying different phase-shifts to the signals corresponding to the tone. Such processing substantially reduces undesirable effects of the communication channel, e.g., strong attenuation (fading) of individual tones. For example, for each tone, signals transmitted via different antennas are phase-shifted such that they arrive substantially in phase and interfere constructively at the destination receiver, e.g., a single-antenna CLT. As a result, an improved effective communication channel is established between the AP and CLT.

Figure 6:
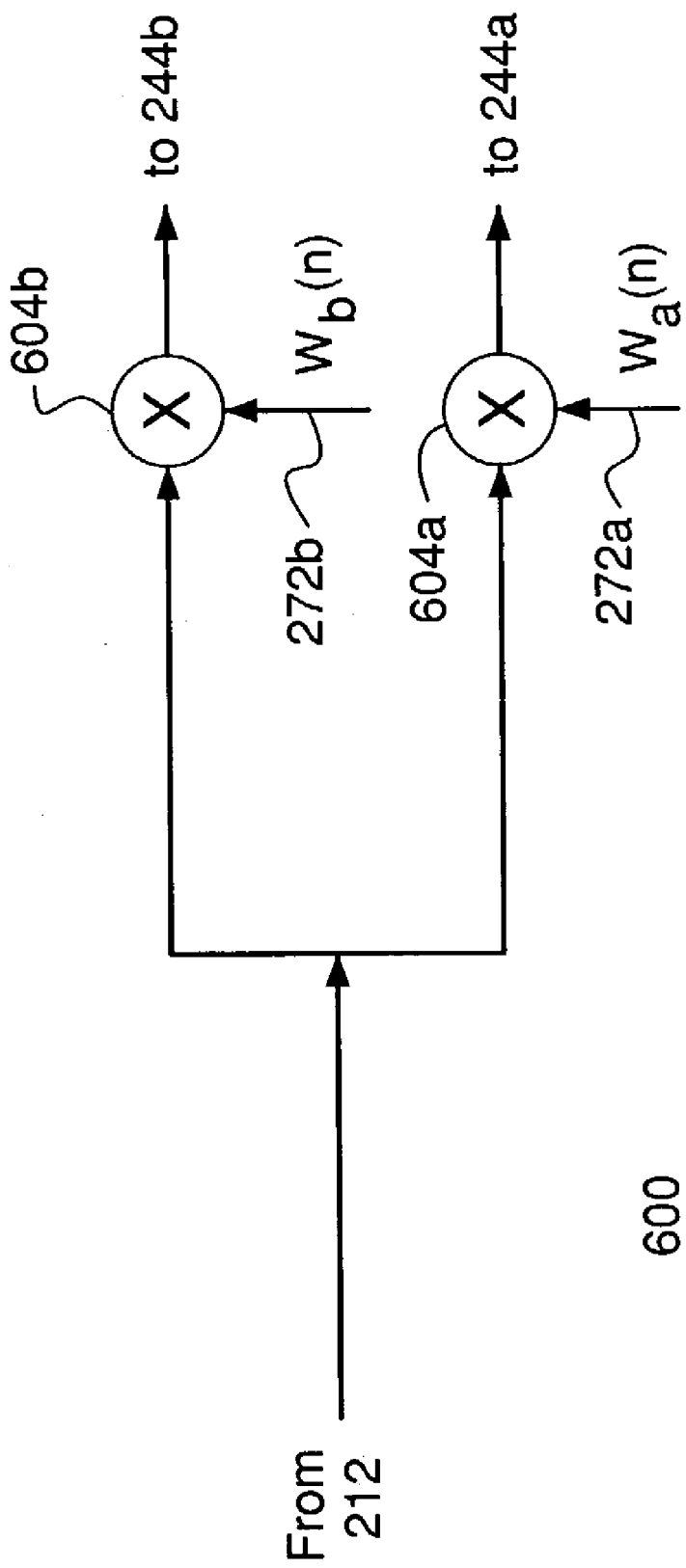
FIG. 6 shows schematically a branch partitioning circuit of the transceiver shown in FIG. 2 according to one embodiment of the present invention.

FIG. 6 shows circuit 600, which can be used as circuit 250 in transceiver 200 (FIG. 2) according to one embodiment of the present invention. Circuit 600 is designed to control the partitioning of RF power transmitted on two antennas 224a-b. For each OFDM tone, circuit 600 processes an I/Q pair generated by mapping converter 212 to produce two weighted $I_{a,b}/Q_{a,b}$ pairs, one pair per transmitter branch. Each weighted pair is then applied to the corresponding transmitter branch 244 and processed independently for transmission of the corresponding RF signals via the respective antenna 226.

In one embodiment, circuit 600 processes an I/Q pair as follows:

$$I_{a,b}(n) = Re\{W_{a,b}(n)(I(n) + iQ(n))\} \quad (4A)$$

$$Q_{a,b}(n) = Im\{W_{a,b}(n)(I(n) + iQ(n))\} \quad (4B)$$

where $I_a(n)/Q_a(n)$ and $I_b(n)/Q_b(n)$ are the weighted I/Q pairs corresponding to the n-th tone and applied to. branches 244a and 244b, respectively; and $W_{a,b}(n)$ are weighting coefficients.

In one embodiment, circuit 600 includes two complex-number multipliers 604a-b that are similar to multipliers 504a-b of circuit 500 (FIG. 5). Each multiplier 604 receives two inputs, the first being a copy of the output of converter 212 and the second being the corresponding signal 272 from CSI processor 270 (FIG. 2). Each multiplier 604 performs complex-number multiplication and generates a weighted I/Q pair for each tone, e.g., according to Equations 4A-B, which pair is then applied to the corresponding transmitter branch 244.

Figure 7B:
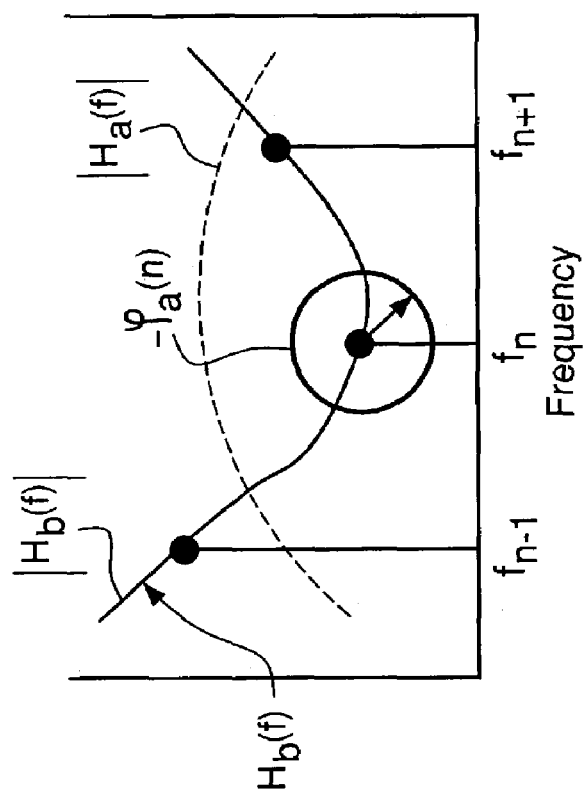
FIGS. 7A-B graphically illustrate a partitioning scheme that can be implemented in the transceiver shown in FIG. 2 according to one embodiment of the present invention.
Figure 7A:
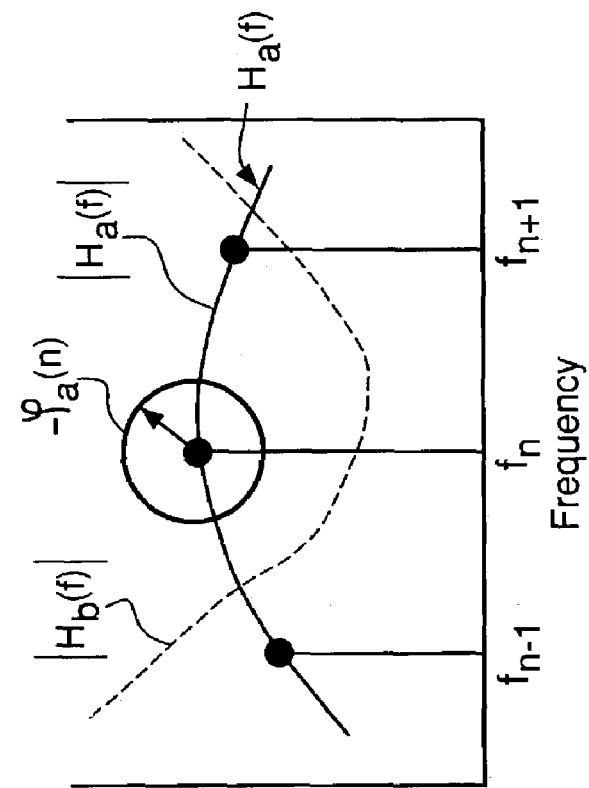

FIGS. 7A-B illustrate a partitioning scheme that can be implemented in transceiver 200 according to one embodiment of the present invention. This scheme is referred to as the maximum ratio transmit (MRT) scheme hereafter. More specifically, FIGS. 7A and 7B illustrate representative OFDM tones corresponding to branches 244a and 244b, respectively, of transceiver 200. Two curves labeled $H_{a,b}(f)$ illustrate spectral properties of the corresponding communication sub-channels. Functions $H_{a,b}(f)$ are complex functions of frequency $f$ and can be expressed in terms of amplitude $|H_{a,b}(f)|$ and phase $$\varphi_{a,b}(f) = \arctan \frac{Im H_{a,b}(f)}{Re H_{a,b}(f)}.$$

Only the amplitudes of functions $H_{a,b}(f)$ are shown in FIGS. 7A-B. In one embodiment, the CSI information comprises complex values $C_{a,b}(n)$ related to discrete samples of functions $H_{a,b}(f)$ as expressed by the following equation:

$$C_{a,b}(n) = H_{a,b}(f_n) \quad (5)$$

where $f_n$ is a frequency corresponding to the n-th tone. In contrast with the receive operation, where the values of $C_{a,b}(n)$ can be derived using the packet preamble, for the transmit operation, the values of $C_{a,b}(n)$ are not available directly and need to be obtained separately, e.g., using one of the channel estimation schemes described in more detail in the next section.

In one implementation, weighting coefficients $W_{a,b}(n)$ employed in the MRT scheme are calculated according to Equation (3). Therefore, for each tone, each communication sub-channel receives a portion of RF energy that is proportional to a transmission coefficient $T_{a,b}=|H_{a,b}(f_n)|$ where the attenuation of the tone in the sub-channel is proportional to $1/H_{a,b}(f_n)$. For example, since $|H_a(f_n)|>|H_b(f_n)|$ for the states of the sub-channels illustrated in FIGS. 7A-B, antenna 224a transmits more RF energy corresponding to the n-th tone than antenna 224b.

In addition to RF-power partitioning, for each tone, the MRT scheme pre-compensates for the phase shift acquired in the respective communication sub-channel. For example, for the n-th tone, application of weighting coefficient $W_{a,b}(n)$ given by Equation (3) imparts a phase shift of $-\phi_{a,b}(n)$ prior to transmission, as illustratively indicated by the respective phase-circle diagrams in FIGS. 7A-B. This phase shift is substantially cancelled by the phase shift in the communication sub-channel after the transmission. As a result, for each tone, signals transmitted via different antennas arrive substantially in phase and interfere constructively at the destination receiver, e.g., a CLT.

Figure 8B:
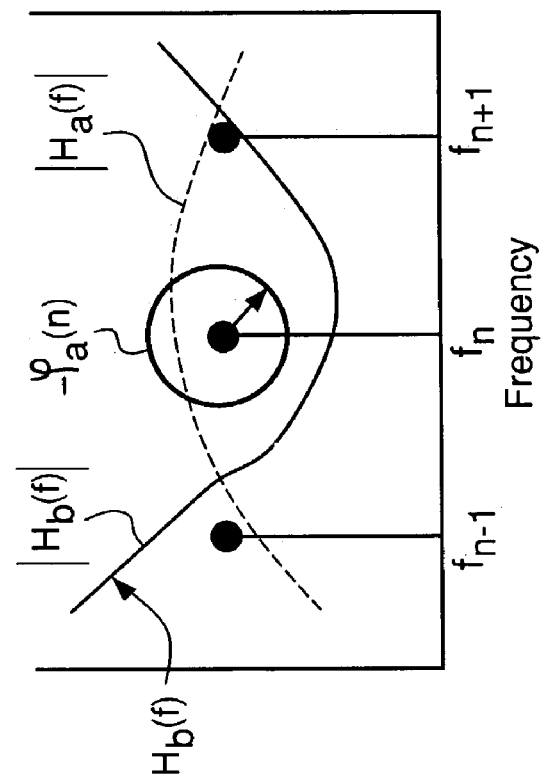
FIGS. 8A-B graphically illustrate a partitioning scheme that can be implemented in the transceiver shown in FIG. 2 according to another embodiment of the present invention.
Figure 8A:
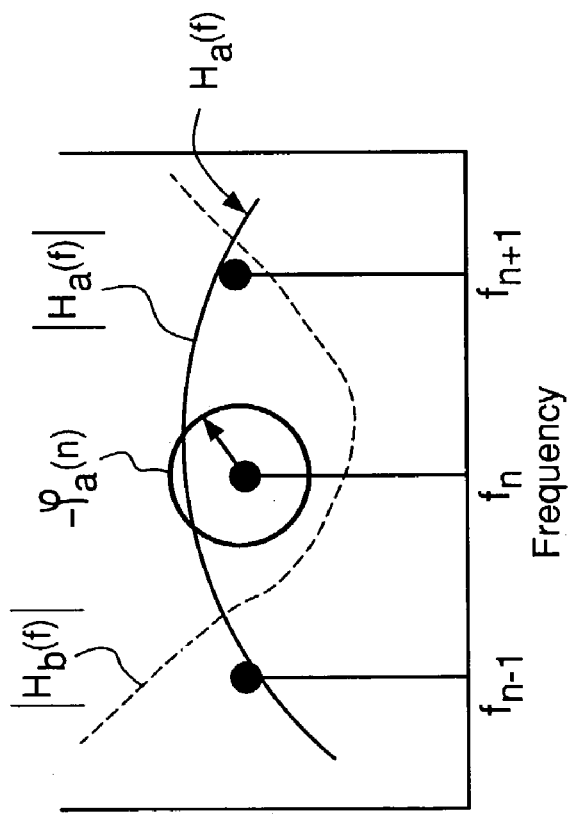

FIGS. 8A-B illustrate a partitioning scheme that can be implemented in transceiver 200 according to another embodiment of the present invention. This scheme is referred to as the equal gain transmit (EGT) scheme hereafter. FIGS. 8A-B are similar to FIGS. 7A-B and illustrate OFDM tones corresponding to branches 244a and 244b, respectively.

In one implementation, weighting coefficients $W_{a,b}(n)$ employed in the EGT scheme are calculated according to Equation (6) as follows:

$$W_{a,b}(n) = \frac{C^*_{a,b}(n)}{\sqrt{2}\,|C_{a,b}(n)|} \equiv \frac{1}{\sqrt{2}}\exp(-i\varphi_{a,b}(n)) \qquad (6)$$

Therefore, differently from the MRT scheme, substantially equal RF power is applied to the two communication sub-channels for each tone. However, similar to the MRT scheme, the EGT scheme pre-compensates for the phase shift acquired in the respective communication sub-channel. For example, for the n-th tone, application of weighting coefficients $W_{a,b}(n)$ given by Equation (6) imparts phase shifts of $-\phi_{a,b}(n)$ prior to transmission. Therefore, similar to the MRT scheme, the EGT scheme produces constructive interference at the destination receiver.

Figures 9A, 9B:
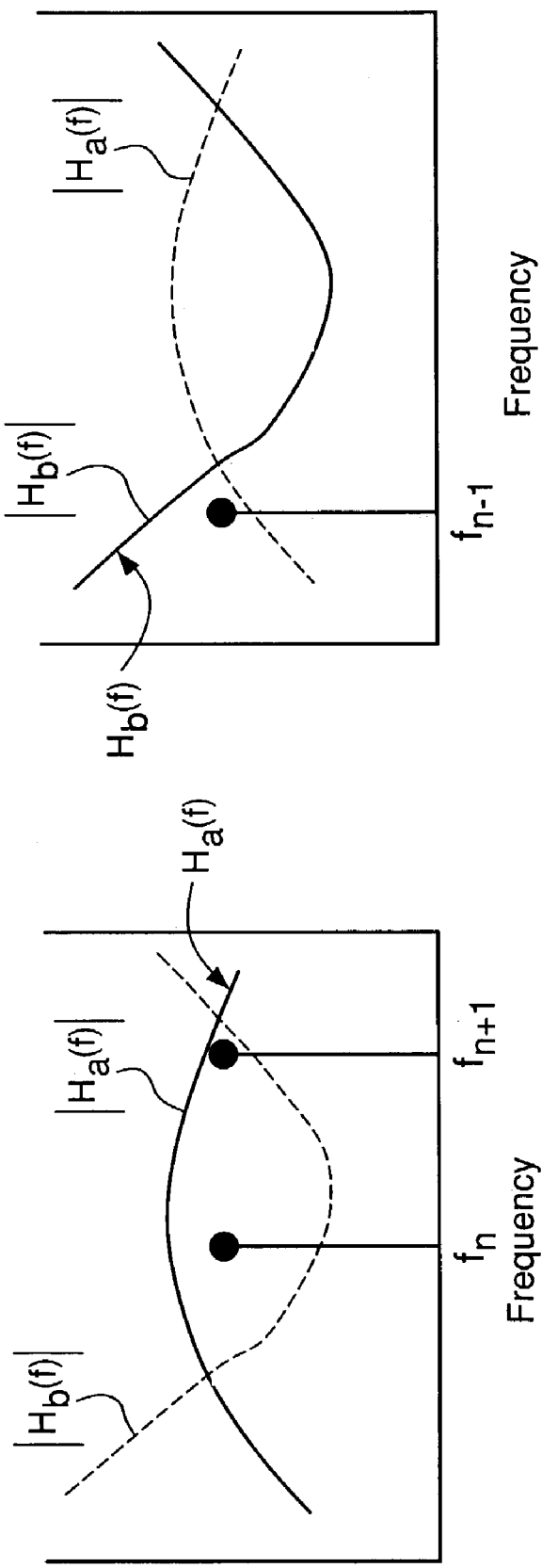
FIGS. 9A-B graphically illustrate a partitioning scheme that can be implemented in the transceiver shown in FIG. 2 according to yet another embodiment of the present invention.

FIGS. 9A-B illustrate a partitioning scheme that can be implemented in transceiver 200 according to yet another embodiment of the present invention. This scheme is referred to as the sub-channel select transmit (SST) scheme hereafter. FIGS. 9A-B are similar to FIGS. 7A-B and 8A-B and illustrate OFDM tones corresponding to branches 244a (FIG. 9A) and 244b (FIG. 9B).

In one implementation, each weighting coefficient $W_{a,b}(n)$ employed in the SST scheme is either 1 or 0 and is determined, e.g., as follows:

$W_a(n)=1$ and $W_b(n)=0$, if $|C_a(n)| \geq |C_b(n)|$ \qquad (7A)

$W_a(n)=0$ and $W_b(n)=1$, if $|C_a(n)| < |C_b(n)|$ \qquad (7B)

Therefore, for each tone, the communication sub-channel with the lowest attenuation receives the entire RF power corresponding to the tone. For example, as illustrated in FIGS. 9A-B, antenna 224a transmits RF signals corresponding to the n-th and (n+1)-th tones, while antenna 224b transmits RF signals corresponding to the (n−1)-th tone. In contrast with the MRT and EGT schemes, the SST scheme does not implement phase-shift pre-compensation. However, RF power corresponding to each tone is applied to only one sub-channel, thereby addressing the problem of destructive interference of RF signals from different sub-channels at the destination receiver.

Figure 10:
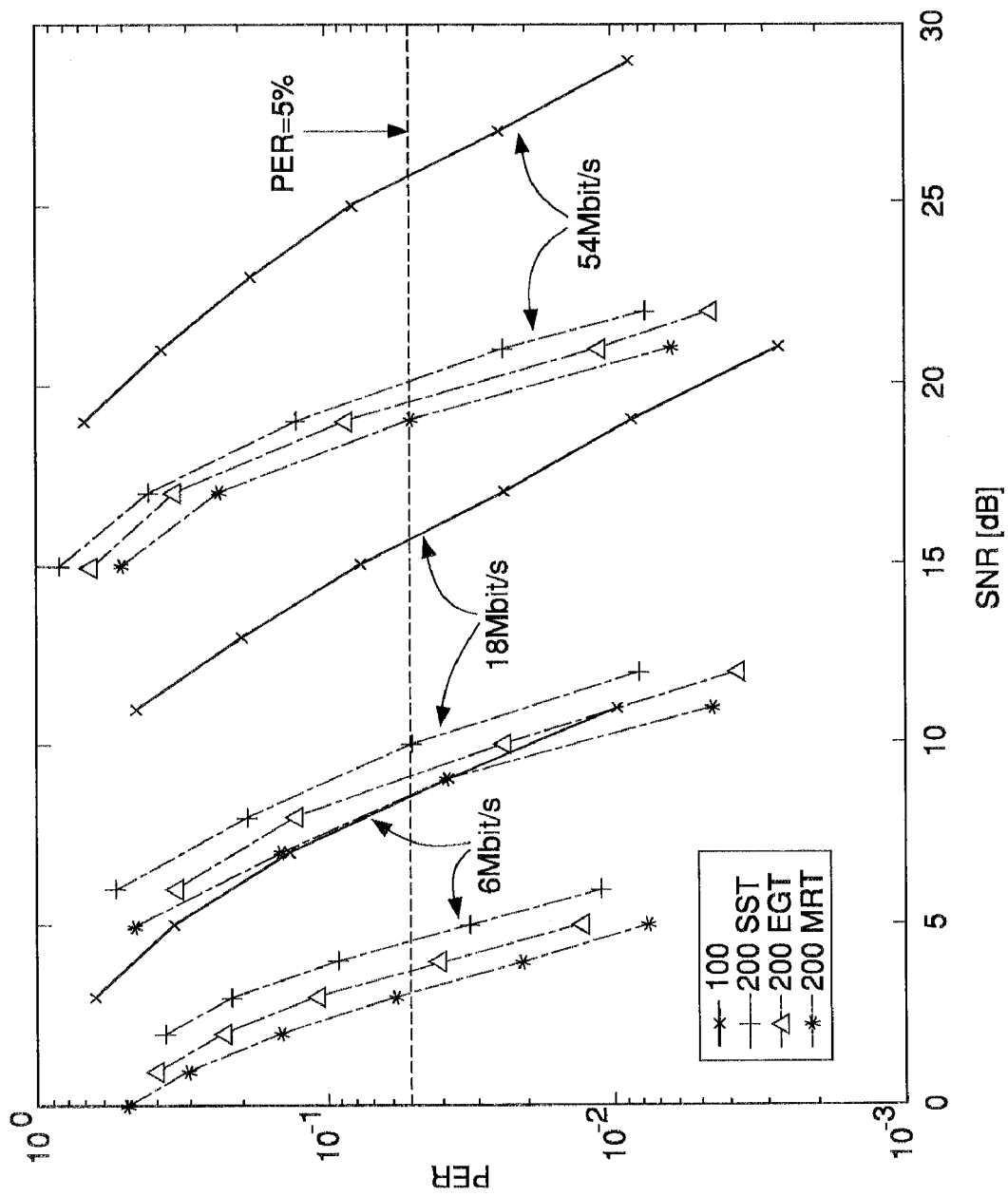
FIG. 10 graphically demonstrates performance improvement of the transceiver of FIG. 2 over the transceiver of FIG. 1.

FIG. 10 compares the transmit performance of transceiver 200 operating at 6, 18, and 54 Mbit/s with that of a similarly operated single-antenna transceiver, e.g., transceiver 100. More specifically, for each transceiver, packet error rate (PER)-versus-SNR curves are shown for a representative communication channel having a characteristic decay constant of 100 ns. For transceiver 200, PER-versus-SNR curves corresponding to the MRT, EGT, and SST schemes are shown for each bit rate. As can be seen in FIG. 10, at PER=5% (indicated by the horizontal dotted line), transceiver 200 realizes a performance improvement of between about 5.5 and 7.5 dB over transceiver 100 for each of the three bit rates. In other words, for a given transmit power level, transceiver 200 can transmit over longer distances than transceiver 100 and still achieve the same or better PER. The MRT scheme provides the largest performance improvement, where the SNR differences between the MRT scheme and the EGT and SST schemes are about 0.5-1.0 dB and 1.0-1.5 dB, respectively. Similar to the receive operation, these performance improvements can be used, for example, to extend the range corresponding to a selected transmission bit rate, increase the transmission bit rate between communicating transceivers, and/or reduce electrical power consumption.

Channel Estimation

As described above, transceiver 200 derives CSI information from uplink (UL) packets received from another transceiver for use in both (1) processing those received UL packets and (2) processing subsequent DL packets to be transmitted back to that other transceiver. In general, a channel estimation method described below can be implemented for both contention-based and scheduled TDD-based WLAN systems. However, as indicated where appropriate, some scenarios of communication sequences considered below are specific to contention-based WLAN systems only.

Figure 11:
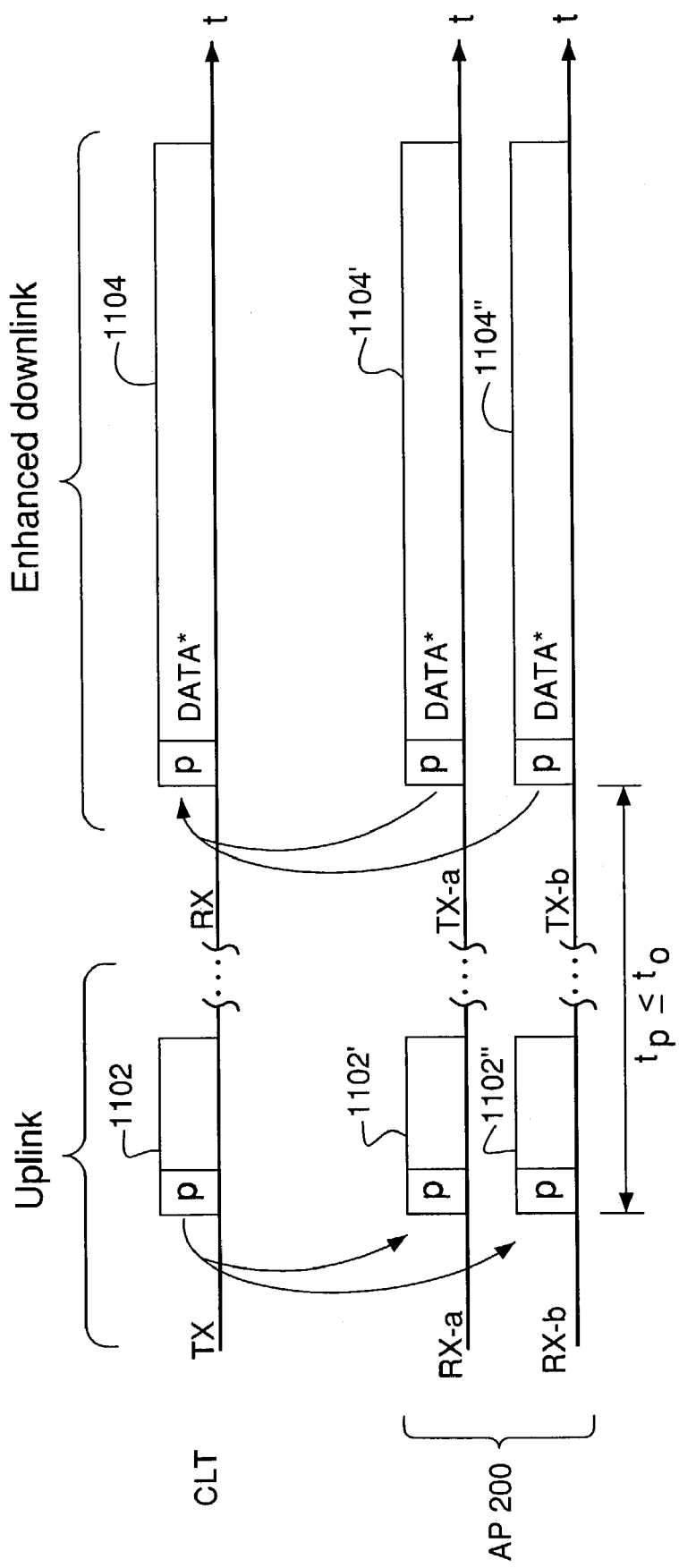
FIG. 11 graphically shows how a received packet is used to derive channel state information (CSI) in the transceiver of FIG. 2 according to one embodiment of the present invention.

FIG. 11 illustrates generically how an UL packet received at AP transceiver 200 from a particular (single-antenna) CLT transceiver is used to derive CSI information that may then be used to process a subsequent DL packet for transmission from transceiver 200 to that particular CLT, according to one embodiment of the present invention.

In particular, during the UL transmission, the CLT sends packet 1102 to AP 200, which is received as packets 1102' and 1102" via antennas 224a and 224b, respectively. Using the preamble (labeled P in FIG. 11) of each packet 1102' and 1102", processor 270 derives CSI information for the state of the corresponding communication sub-channel during this UL transmission, for example, as described above in the context of FIGS. 2, 4, and 5. The CSI information for the two sub-channels forms the current CSI set for the channel between transceiver 200 and the particular CLT. Processor 270 keeps track of the time that the current CSI set was generated. During the subsequent DL transmission, AP 200 transmits weighted packets 1104' and 1104" via antennas 224a and 224b, respectively, which packets superimpose at the CLT to produce packet 1104. Since the characteristics of the channel between the two transceivers vary over time, the accuracy of a given set of CSI information will typically depend on the age of that information (i.e., the time between receipt of the most-recent UL packet from which CSI information is derived and the time of transmission of a subsequent DL packet).

The scenario shown in FIG. 11 may correspond to two different situations. In one situation, the CLT initiates a current sequence of packets being transmitted back and forth with transceiver 200, while, in the other situation, transceiver 200 initiates the current communication sequence. In the former situation, packet 1102 may represent the first packet and packet 1104 may represent the second packet in the communication sequence. In that case, the CSI information was derived from UL packet 1102 relatively recently and may be safely used to accurately process DL packet 1104.

In the other situation, however, where transceiver 200 initiates the communication sequence, packet 1104 represents the first packet in the current communication sequence, while packet 1102 may represent the last packet received at transceiver 200 from the same CLT (e.g., during a previous communication sequence). In that case, the CSI information derived from UL packet 1102 may be relatively old, and therefore the issue of whether to use that CSI information to process DL packet 1104 needs to be addressed. In one possible implementation, transceiver 200 uses the current CSI set in processing DL packet 1104 only if the CSI set was generated within a specified time period. If the CSI set is too old, then transceiver 200 applies a "blind" partitioning scheme. This time-based thresholding is indicated in FIG. 11 by the comparison of the age $t_p$ of the CSI set to the current threshold value $t_0$. Note that the threshold value $t_0$ may vary over time, e.g., as a function of the current decay constant of the communication channel, or be a constant.

If the current CSI set is too old, one of the following blind partitioning schemes can be used: (1) transmitting signals via one antenna only; (2) splitting the RF power between the antennas (e.g., 50/50) with no phase adjustment; and (3) transmitting two signal copies, each via a different antenna, where the second copy is time-delayed relative to the first copy. In one embodiment, to implement the time-delay blind partitioning scheme, transmitter branch 244b includes an optional delay circuit (not shown in FIG. 2) between CP adder 220b and RF transmitter 222b.

If the current CSI set is to be used, then processor 270 configures circuit 250 to apply weighting coefficients determined based on a selected partitioning scheme, which can be, for example, one of the above-described MRT, EGT, and SST partitioning schemes. Since application of a partitioning scheme produces an improved effective communication channel between the AP and CLT, an enhanced downlink can be implemented using a higher bit rate than, for example, that during a regular downlink. The higher bit rate corresponding to the enhanced downlink is illustratively indicated by the asterisk in FIG. 11.

FIGS. 12-15 illustrate the application of channel estimation processing for different scenarios of communication sequences between an AP transceiver 200 and a CLT (single-antenna) transceiver.

More specifically, FIGS. 12A-B show two representative communication sequences between AP 200 and a single-antenna CLT, where each transmitted packet is indicated by solid lines and each received packet is indicated by dotted lines. Both communication sequences shown in FIGS. 12A-B have two data packets, each followed by an acknowledgement (ACK). An acknowledgement is a service OFDM packet, which confirms to the originating party that the corresponding data packet has been received by the destination party. If the ACK packet is not received, then the originating party will retransmit the data packet.

The communication sequence of FIG. 12A has a UL data packet followed by a DL data packet, each followed by a corresponding acknowledgement. During the UL transmission, AP 200 receives via antennas 224a-b data packets 1202' and 1202" corresponding to data packet 1202 transmitted by the CLT. In response, AP 200 transmits ACK packets 1204' and 1204", which are received by the CLT as ACK packet 1204. Processor 270 of AP 200 derives and stores a CSI set using preambles (P) of packets 1202' and 1202". Based on the CSI set, processor 270 configures circuit 250 to apply a selected partitioning scheme to one or more of subsequent DL transmissions, for example, as described in the preceding section. Since application of the partitioning scheme likely results in an improved effective communication channel between the AP and CLT, an enhanced downlink can be implemented using a higher bit rate than, for example, that used for transmission of UL packet 1202.

During the enhanced downlink, AP 200 generates and transmits via antennas 224a-b weighted data packets 1206' and 1206", which are received by the CLT as data packet 1206. The higher bit rate corresponding to packets 1206(')(") is indicated by the asterisk in FIG. 12A. Receipt of data packet 1206 by the CLT is acknowledged via ACK packet 1208. In one configuration, in addition to applying a partitioning scheme to generate weighted data packets 1206' and 1206", AP 200 may also be configured to apply the scheme to generate weighted ACK packets 1204' and 1204".

The communication sequence of FIG. 12B has two DL data packets, each followed by a corresponding acknowledgement. During the first DL transmission, AP 200 generates and transmits via antennas 224a-b weighted data packets 1212' and 1212", which are received by the CLT as data packet 1212. The first downlink may be (a) an enhanced downlink implemented using a corresponding CSI set, e.g., similar to the enhanced downlink of FIG. 12A or (b) a regular downlink, e.g., using a blind partitioning scheme if the CSI set is not available or has expired. Receipt of data packet 1212 by the CLT is acknowledged via ACK packet 1214. AP 200 receives the acknowledgement as ACK packets 1214' and 1214" and uses the preambles of these packets to derive a new CSI set. The new CSI set is stored in processor 270, e.g., to replace the previously stored CSI set. The new CSI set is then used during the second downlink shown in FIG. 12B. Similar to the downlink of FIG. 12A, the second downlink of FIG. 12B is an enhanced downlink.

During the second downlink of FIG. 12B, AP 200 generates and transmits on antennas 224a-b weighted data packets 1216' and 1216", which are received by the CLT as data packet 1216. The bit rate corresponding to data packets 1216' and 1216" and indicated by the asterisk may be different from (preferably higher than) that corresponding to packets 1212' and 1212" and indicated by the "#" sign in FIG. 12B. Receipt of data packet 1216 by the CLT is acknowledged via ACK packet 1218.

In the scenarios of FIG. 12, a relatively long time period (time lag) indicated by the break in a time axis may elapse between the derivation of a CSI set and its subsequent application. The time lag may be, for example, due to "fair contention" wireless medium-sharing mechanisms in contention-based WLAN systems. Typically, the best results for the scenario of FIG. 12 will occur when the following conditions apply: (A) the wireless medium is not heavily congested; (B) the communication channel is not subjected to strong time variations; (C) there are no moving RF wave-scattering objects adjacent to the path between the AP and CLT; and (D) the AP and CLT are not themselves in motion.

Figure 13:
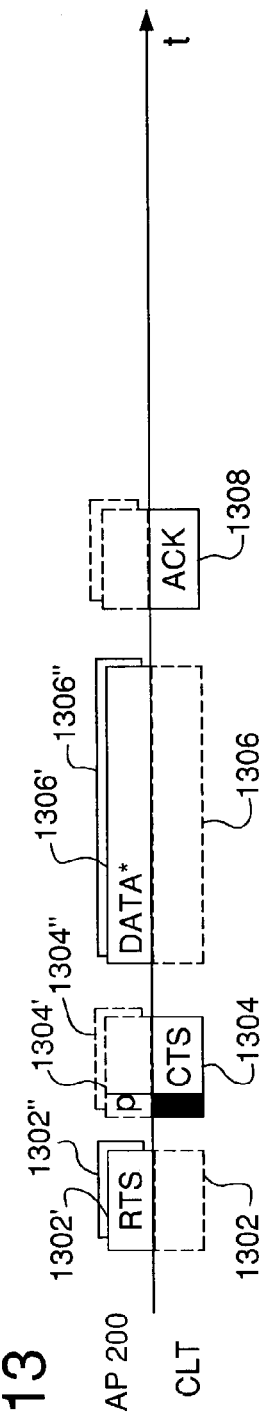
Figure 14:
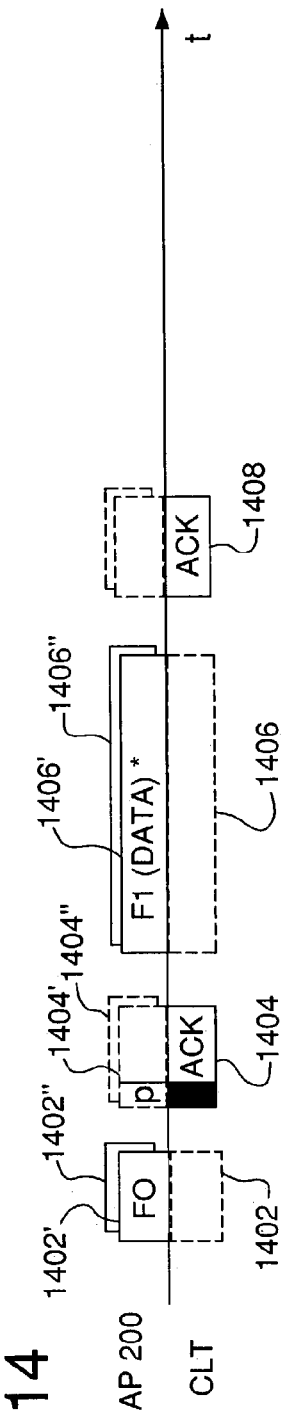
Figure 15:
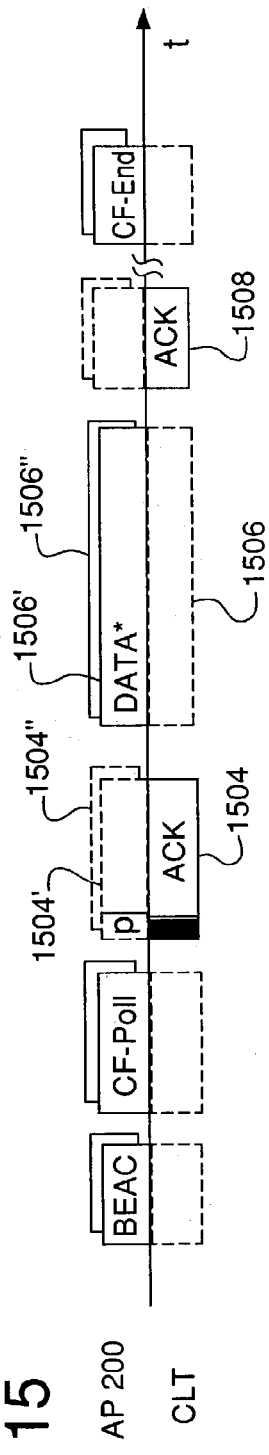

In the scenarios of FIGS. 13-15, AP 200 derives the CSI information using a packet that was actively solicited from a CLT. Since the solicited UL packet is received within a relatively short time interval immediately prior to the transmission of a corresponding DL packet, the CSI set derived by processing the UL packet provides a relatively accurate estimate of the state of the communication channel during the DL transmission.

The scenario of FIG. 13 illustrates the use of a channel reservation mechanism specified in Standard 802.11 to both reserve the communication channel and obtain the CSI information. According to the standard, channel reservation is implemented using two service OFDM packets. The first service packet is transmitted by the data-originating party and is referred to as a request to send (RTS). The second service packet is an acknowledgement (clear to send, CTS) from the destination party that it is available and ready to receive data.

FIG. 13 shows a representative communication sequence including RTS and CTS packets exchanged between AP 200 and a single-antenna CLT. Similar to FIG. 12, each transmitted packet is indicated by solid lines and each received packet is indicated by dotted lines. The communication sequence of FIG. 13 begins with a request to send (RTS packets 1302' and 1302") from AP 200, which is received by the CLT as RTS packet 1302. RTS packets 1302' and 1302" are preferably transmitted using a blind partitioning scheme. In response, the CLT transmits CTS packet 1304, which is received by AP 200 via antennas 224a-b as packets 1304' and 1304". Processor 270 of AP 200 derives a CSI set using the preambles (P) of packets 1304' and 1304". Based on the CSI set, processor 270 configures circuit 250 to apply a selected (MRT, EGT, or SST) partitioning scheme to the generation and transmission of weighted data packets 1306' and 1306", which are received by the CLT as packet 1306. Receipt of packet 1306 by the CLT is acknowledged via ACK packet 1308.

As already indicated above, in the scenario of FIG. 12, AP 200 may have to compete with other terminals for access to the wireless medium after the CSI information has been derived. In contrast, in the scenario of FIG. 13, the sequence of packets is pre-defined in accordance with the standard. In particular, no other terminal is allowed to interfere (send packets) during the time interval between packets 1304 and 1306. As a result, the time lag between those packets should be relatively small; the CSI set derived from the processing of packets 1304' and 1304" should provide an accurate estimate of the states of the communication sub-channels; and an enhanced downlink using a relatively high bit rate can be implemented for transmission of packets 1306' and 1306" as indicated by the asterisk in FIG. 13.

The scenario of FIG. 14 illustrates the use of a fragmentation mode specified in Standard 802.11 or a similar mode specified in Standard HIPERLAN/2. During such mode, a data sequence is divided (fragmented) between two or more data packets, which are then serially transmitted. Illustratively, FIG. 14 shows a communication sequence for transmission of two fragments F0 and F1.

The communication sequence of FIG. 14 begins with the transmission of a short (preferably substantially empty) data fragment F0, which is transmitted by AP 200 via antennas 224a-b using packets 1402' and 1402" and received by the CLT as packet 1402. Packets 1402' and 1402" are preferably transmitted using a blind partitioning scheme. In response, the CLT transmits ACK packet 1404, which is received by AP 200 as packets 1404' and 1404". Processor 270 of AP 200 derives a CSI set using the preambles (P) of packets 1404' and 1404" and, based on the CSI set, configures circuit 250 to apply a selected (MRT, EGT, or SST) partitioning scheme to the generation and transmission of weighted data packets 1406' and 1406" having data fragment F1. Packets 1406' and 1406" are received by the CLT as packet 1406 and acknowledged via ACK packet 1408.

Similar to the scenario of FIG. 13, in the scenario of FIG. 14, the sequence of packets is pre-defined in accordance with the standard. In particular, other terminals will not interfere during the time interval between packets 1404 and 1406. As a result, an enhanced downlink using a relatively high bit rate can be implemented for transmission of packets 1406' and 1406" as indicated by the asterisk in FIG. 14.

The scenario of FIG. 15 illustrates the use of a point coordination function (PCF) mode specified in Standard 802.11. During such mode, the AP temporarily takes control over the access to the wireless medium to provide contention-free (CF) data transfer while the "fair contention" wireless medium-sharing mechanisms are temporarily suspended. FIG. 15 graphically shows a representative communication sequence corresponding to the PCF mode.

The communication sequence of FIG. 15 begins with two service packets specified in Standard 802.11. The first service packet (labeled BEAC in FIG. 15) is a periodic beacon broadcast by AP 200 to define timing in the WLAN system and provide synchronization to all CLTs. A beacon can also be used to announce a CF period, which begins after the beacon. The second service packet (labeled CF-Poll in FIG. 15) is a permission to a particular CLT to transmit during the CF period. In response to the CF-Poll packet, the CLT transmits ACK packet 1504, which is received by AP 200 as packets 1504' and 1504". Processor 270 of AP 200 derives a CSI set using the preambles (P) of packets 1504' and 1504" and, based on the CSI set, configures circuit 250 to apply a selected (MRT, EGT, or SST) partitioning scheme to the generation and transmission of weighted data packets 1506' and 1506", which are received by the CLT as packet 1506. Receipt of packet 1506 by the CLT is acknowledged via ACK packet 1508. The end of the CF period is announced by AP 200 via a third service packet (labeled CF-End in FIG. 15). The BEAC, CF-Poll, and CF-End packets are preferably transmitted using a blind partitioning scheme.

Since the scenario of FIG. 15 is implemented during a CF period, by default, other terminals cannot interfere during the time interval between packets 1504 and 1506. As a result, similar to the scenarios of FIGS. 13 and 14, an enhanced downlink using a relatively high bit rate can be implemented for transmission of packets 1506' and 1506" as indicated by the asterisk in FIG. 15.

Although the scenarios of FIGS. 11-15 were described in reference to (multi-branch) transceiver 200, those schemes may also be applied to a transceiver having one receiver branch and one transmitter branch coupled to a single antenna. Such transceiver can be configured to use CSI information to efficiently distribute RF power over the various tones and/or lower the total emitted RF power. For example, if, for a given tone, signal attenuation in the communication channel is determined to be relatively low, then the transceiver may emit less RF power corresponding to that tone without sacrificing the PER and/or bit rate. Similarly, if signal attenuation for a different tone is relatively high, then the transceiver may emit more RF power for that tone in order to maintain PER and/or bit rate. A net decrease in total emitted RF power would correspondingly reduce electrical power consumption by the transceiver, which is important, e.g., for portable devices, where electrical power is supplied by a battery. As a result, for a given battery size, battery operating time can be extended or, alternatively, a smaller battery can be used to supply the transceiver for the same period of time.

Although the present invention was described with reference to a dual-branch OFDM transceiver, an OFDM transceiver having three or more branches in each of the receive and transmit paths can be implemented in analogous fashion.

Different partitioning schemes may be applied to the generation of weighted OFDM packets. Incoming OFDM packets of various types may be used to derive the CSI information corresponding to the communication sub-channels. Although certain embodiments of the present invention were described in reference to an access point of a WLAN system, those embodiments may also be implemented in a client terminal.

Although CSI derivation was described as being performed independently each time a new incoming packet arrives, in alternative embodiments, a new CSI set can be derived based on both the previous CSI set and the CSI set derived from a new packet Furthermore, CSI derivation may be performed selectively. For example, if, when a new incoming packet is received, the age of the most recent CSI set exceeds a specified threshold, which threshold may be different from the previously described threshold $t_0$, then a new CSI set is derived using the new incoming packet. However, if the age of the most recent CSI set is less than the specified threshold, then CSI derivation is not performed and the current CSI set remains in use, thereby potentially reducing the overall processing overhead associated with deriving CSI information.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

What is claimed is:

1. A method of signal processing for a WLAN system, comprising:
   receiving incoming signals transmitted from a second node of the WLAN system at first and second antennas of a first node of the WLAN system;
   based on the incoming signals, determining attenuation information for first and second sub-channels corresponding to the first and second antennas, respectively; and
   generating outgoing signals for transmission from the first and second antennas to the second node using a multi-carrier modulation scheme based on a plurality of tones, wherein:
   for each tone, substantially all RF power is applied to the sub-channel having lower relative attenuation; and
   during transmission, each of the first and second antennas transmits at least one tone, wherein a set of tones transmitted by the first antenna and a set of tones transmitted by the second antenna differ by at least one tone.

2. The invention of claim 1, wherein:
   the WLAN system is a contention-based WLAN system conforming to an IEEE 802.11 standard;
   the first node is an access point of the WLAN system; and
   the second node is a client terminal of the WLAN system.

3. The invention of claim 1, wherein:
   the first node characterizes the age of the attenuation information and determines whether to use the attenuation information in generating the outgoing signals based on the age of the attenuation information; and
   if the age of the attenuation information exceeds a threshold value, then the first node generates the outgoing signals independent of the attenuation information.

4. The invention of claim 1, wherein, when the first node has data to transmit to the second node, the first node transmits a first packet to the second node in order to cause the second node to transmit the incoming signals to the first node to enable the first node to derive the attenuation information for generating the outgoing signals based on the data.

5. The invention of claim 4, wherein the data rate of the outgoing signals is greater than the data rate of the first packet.

6. The invention of claim 4, wherein the first packet corresponds to a request-to-send (RTS) packet, and the incoming signals correspond to a clear-to-send (CTS) packet.

7. The invention of claim 4, wherein the first packet corresponds to a first data fragment of the data to be transmitted, the incoming signals correspond to an acknowledgment packet for the first packet, and the outgoing signals correspond to a second data fragment of the data to be transmitted.

8. The invention of claim 7, wherein the first data fragment is empty.

9. The invention of claim 4, wherein the first packet corresponds to a contention-free (CF) poll packet, and the incoming signals correspond to an acknowledgment packet for the CF poll packet.

10. Apparatus for a first node in a WLAN system, comprising:
    a receive path adapted to (i) receive incoming signals transmitted from a second node of the WLAN system at first and second antennas of the first node, and (ii) determine, based on the incoming signals, attenuation information for first and second sub-channels corresponding to the first and second antennas, respectively; and
    a transmit path adapted to generate outgoing signals for transmission from the first and second antennas to the second node using a multi-carrier modulation scheme based on a plurality of tones, wherein:
    for each tone, substantially all RF power is applied to the sub-channel having lower relative attenuation; and
    during transmission, each of the first and second antennas transmits at least one tone, wherein a set of tones transmitted by the first antenna and a set of tones transmitted by the second antenna differ by at least one tone.

11. The invention of claim 10, wherein:
    the WLAN system is a contention-based WLAN system conforming to an IEEE 802.11 standard;
    the first node is an access point of the WLAN system; and
    the second node is a client terminal of the WLAN system.

12. The invention of claim 10, wherein:
    the apparatus characterizes the age of the attenuation information and determines whether to use the attenuation information in generating outgoing signals based on the age of the attenuation information; and
    if the age of the attenuation information exceeds a threshold value, then the apparatus generates outgoing signals independent of the attenuation information.

13. The invention of claim 10, wherein, when the first node has data to transmit to the second node, the first node transmits a first packet to the second node in order to cause the second node to transmit the incoming signals to the first node to enable the first node to derive the attenuation information for generating the outgoing signals based on the data.

14. The invention of claim 13, wherein the data rate of the outgoing signals is greater than the data rate of the first packet.

15. The invention of claim 13, wherein the first packet corresponds to a request-to-send (RTS) packet, and the incoming signals correspond to a clear-to-send (CTS) packet.

16. The invention of claim 13, wherein the first packet corresponds to a first data fragment of the data to be transmitted, the incoming signals correspond to an acknowledgment packet for the first packet, and the outgoing signals correspond to a second data fragment of the data to be transmitted.

17. The invention of claim 16, wherein the first data fragment is empty.

18. The invention of claim 13, wherein the first packet corresponds to a contention-free (CF) poll packet, and the incoming signals correspond to an acknowledgment packet for the CF poll packet.

19. The invention of claim 10, wherein the set of tones transmitted by the first antenna and the set of tones transmitted by the second antenna have no common tones.

20. The invention of claim 1, wherein the set of tones transmitted by the first antenna and the set of tones transmitted by the second antenna have no common tones.

* * * * *